(No Model.)
C. W. McKELVEY.
HARROW.
No. 313,357. Patented Mar. 3, 1885.
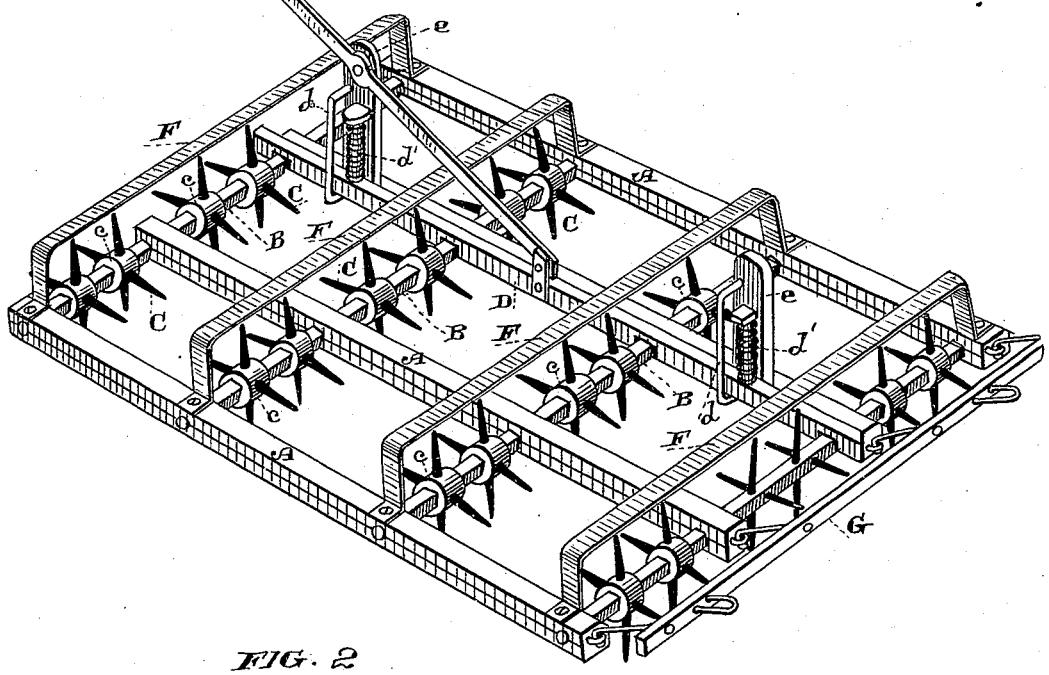
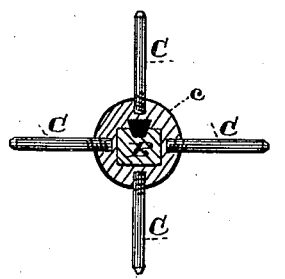
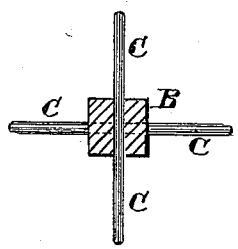
Witnesses,
Geo. H. Strong.
J. H. Nourse.
Inventor
C. W. McKelvey
By Dewey & Co.
Attorneys

UNITED STATES PATENT OFFICE.

CHRISTOPHER W. McKELVEY, OF LOS ANGELES, CALIFORNIA.

HARROW.

SPECIFICATION forming part of Letters Patent No. 313,357, dated March 3, 1885.

Application filed May 23, 1884. (No model.)

*To all whom it may concern:*

Be it known that I, CHRISTOPHER W. MC-KELVEY, of the city and county of Los Angeles, and State of California, have invented an Improvement in Harrows; and I hereby declare the following to be a full, clear, and exact description thereof.

My invention relates to the class of harrows in which the teeth are adapted to rotate or revolve in a vertical plane to clean or clear themselves.

My invention consists in the peculiar construction and combination of devices, all of which I shall hereinafter fully explain.

The object of my invention is to provide a simple and effective self-cleaning harrow.

Referring to the accompanying drawings, Figure 1 is a perspective view of my harrow. Fig. 2 is a cross-section of a rocker-shaft, B, showing the arrangement of teeth. Fig. 3 is a similar section showing a modified arrangement of teeth.

The frame of the harrow consists of the longitudinal bars A and cross-bars B. These bars are rocker-shafts, being journaled in the bars A in suitable manner, as by making the bars A of two pieces, as shown, one laid on top of the other, and confining the journals of the rocker-shafts in suitable boxes. Upon these rocker-shafts are secured the teeth C. When the shafts are made of iron, the teeth C are arranged as shown in Fig. 2. They consist of radial bars, each fitted into a socket on a central hub, c, which is then keyed fast on the shafts; but when the shafts are made of wood the teeth simply consist of bars passed through the shafts at right angles, as shown in Fig. 3, each bar forming two teeth. The bodies of the rocker-shafts are preferably made square or angular for the engagement therewith of the notched locking-bar D. This bar is fitted in vertical guides d, secured to one of the frame-bars A, and is adapted to move vertically in its guides. Springs d' hold it down to its engagement with the rocker-shafts, whereby they are prevented from turning.

E is a lever pivoted to the top of a standard, e, and connected at its forward end with the locking-bar D. By operating this lever the locking-bar is raised from its engagement with the rocker-shafts, whereby they are released, and their teeth are enabled to turn.

F are plates forming shields for the rows of teeth. These are bolted at each end to the harrow-frame, and rise over and extend parallel with the rocker-shafts, and serve as fenders for the teeth.

G is the evener-bar.

The operation of the harrow is as follows: The locking-bar being in engagement with and holding the rocker-shafts stationary, the teeth are also held fixed and the ground is harrowed. When the teeth become clogged, the lever E is forced down to raise the locking-bar out of engagement with the rocker-shafts, and these being freed the teeth all rotate in a vertical plane and free themselves. The lever being then released, the teeth again become fixed, as described.

Having thus described my invention, what I claim as new, and desire to secure by Letters Patent, is—

1. In a harrow constructed as described, the notched locking-bar D, engaging the rocker-shafts, in combination with the guides d, in which the bar is fitted, the springs for holding down said bar, and the lever for raising and lowering said bar, substantially as herein set forth.

2. In a harrow, the frame-bars A, rocker-shafts B, the teeth C, secured in hubs on the rocker-shafts, a locking-bar having a vertical movement in guides d, springs for holding the bars down, a lever for operating said bars, and shield-plates secured to the frame, and extending over each rocker-shaft, all constructed to operate as and for the purpose herein set forth.

3. In a harrow, the frame-bars A, rocker-shafts B, journaled therein, and the teeth C on shafts, in combination with the notched locking-bar D, engaging with the rocker-shafts, the vertical guides d, in which said bar is fitted, the springs d' for holding down said bar to its engagement, and the pivoted lever E for raising it, substantially as herein described.

In witness whereof I have hereunto set my hand.

C. W. McKELVEY.

Witnesses:
JOHN F. WILLARD,
HARRY H. NABOR.